(12) United States Patent
Jordan

(10) Patent No.: US 11,383,780 B2
(45) Date of Patent: Jul. 12, 2022

(54) SADDLE CLAMP

(71) Applicant: Wolf Tooth Components, LLC, Savage, MN (US)

(72) Inventor: Jeffrey Scott Jordan, Fishers, IN (US)

(73) Assignee: Wolf Tooth Components, LLC, Burnsville, MN (US)

( * ) Notice: Subject to any disclaimer, the term of this patent is extended or adjusted under 35 U.S.C. 154(b) by 722 days.

(21) Appl. No.: 16/373,470

(22) Filed: Apr. 2, 2019

(65) Prior Publication Data

US 2019/0300089 A1    Oct. 3, 2019

Related U.S. Application Data

(60) Provisional application No. 62/651,379, filed on Apr. 2, 2018.

(51) Int. Cl.

| B62J 1/08 | (2006.01) |
| B62K 19/36 | (2006.01) |
| F15B 15/16 | (2006.01) |
| F15B 21/044 | (2019.01) |
| F16B 2/06 | (2006.01) |
| F15B 11/072 | (2006.01) |

(52) U.S. Cl.
CPC ............ *B62J 1/08* (2013.01); *B62K 19/36* (2013.01); *F15B 15/16* (2013.01); *F15B 21/044* (2013.01); *F16B 2/065* (2013.01); *B62J 2001/085* (2013.01); *F15B 11/072* (2013.01)

(58) Field of Classification Search
CPC .......... B62J 1/08; B62J 1/10; B62J 2001/085; B62K 19/36
See application file for complete search history.

(56) References Cited

U.S. PATENT DOCUMENTS

| 3,496,838 | A | | 2/1970 | Barrett et al. | |
| 4,155,590 | A | * | 5/1979 | Cunningham | B62J 1/08 |
| | | | | | 297/215.15 |
| 4,773,705 | A | * | 9/1988 | Terranova | B62J 1/002 |
| | | | | | 297/214 |

(Continued)

FOREIGN PATENT DOCUMENTS

| EP | 1799535 | 10/2013 |
| JP | 2004330815 | 11/2004 |

(Continued)

*Primary Examiner* — Daniel J Wiley
(74) *Attorney, Agent, or Firm* — Dicke, Billig & Czaja, PLLC

(57) ABSTRACT

A saddle clamp for a bicycle includes a rail clamp, and a first and a second post clamp. The rail clamp includes a first rail clamp body configured to engage at least a portion of a first rail of a bicycle saddle, and a second rail clamp body configured to engage at least a portion of a second rail of the bicycle saddle, wherein the first and second rail clamp bodies are configured to cooperate to urge the first and second rails towards each other. Each post clamp is configured to engage a bicycle seat post, with the first and second post clamps disposed between the first and second rail clamp bodies, wherein the first and second post clamps are configured to exert a compressive force on the bicycle seat post in response to the first and second rail clamp bodies urging the first and second rails towards each other.

13 Claims, 16 Drawing Sheets

(56) References Cited

U.S. PATENT DOCUMENTS

| | | | |
|---|---|---|---|
| 4,783,119 A * | 11/1988 | Moses | B62J 1/08 297/215.14 |
| 5,333,826 A * | 8/1994 | Lai | B62J 1/08 297/215.14 |
| 5,364,160 A | 11/1994 | Fritschen et al. | |
| 5,433,504 A * | 7/1995 | Kao | B62J 1/08 297/215.15 |
| 5,466,042 A * | 11/1995 | Herman | B62J 1/08 297/215.15 |
| 5,664,829 A * | 9/1997 | Thomson | B62J 1/08 297/215.14 |
| 6,561,579 B1 * | 5/2003 | Weir | B62J 1/08 297/215.15 |
| 6,874,849 B1 * | 4/2005 | Cox | B62J 1/00 297/214 |
| 7,431,391 B2 * | 10/2008 | Hsiao | B62J 1/08 297/215.14 |
| 7,673,936 B2 | 3/2010 | Hsu | |
| 7,681,947 B2 * | 3/2010 | Ritchey | B62J 1/08 297/215.14 |
| 8,007,041 B2 * | 8/2011 | Tisue | B62J 1/08 297/195.11 |
| 8,016,349 B2 | 9/2011 | Mouri et al. | |
| 8,083,289 B2 * | 12/2011 | Chang | B62J 1/08 297/215.14 |
| 8,177,251 B2 | 5/2012 | Shirai | |
| 8,191,964 B2 | 6/2012 | Hsu | |
| 8,267,470 B2 * | 9/2012 | Hsu | B62J 1/08 297/215.14 |
| 8,302,983 B1 | 11/2012 | Hsu | |
| 8,308,124 B2 | 11/2012 | Hsu | |
| 8,596,663 B2 | 12/2013 | Shirai | |
| 8,640,999 B2 * | 2/2014 | Chen | B62J 1/08 297/215.14 |
| 8,727,436 B2 * | 5/2014 | Connors | B62J 1/08 297/195.1 |
| 8,894,141 B2 * | 11/2014 | Tisue | B62J 1/08 297/215.14 |
| 8,950,771 B2 | 2/2015 | Felsi et al. | |
| 9,027,434 B2 | 5/2015 | Neeley | |
| 9,126,647 B2 | 9/2015 | Kuo | |
| 9,157,523 B2 | 10/2015 | Miki et al. | |
| 9,242,688 B2 | 1/2016 | McAndrews et al. | |
| 9,580,124 B2 | 2/2017 | Shirai | |
| 9,745,009 B2 * | 8/2017 | Lin | B62J 1/08 |
| 9,845,126 B2 * | 12/2017 | Ritchey | B62J 1/08 |
| 10,370,051 B2 * | 8/2019 | Staples | B62J 1/08 |
| 10,780,933 B2 * | 9/2020 | Choltco-Devlin | B62J 1/08 |
| 2005/0200170 A1 * | 9/2005 | Liao | B62J 1/08 297/215.15 |
| 2006/0066074 A1 | 3/2006 | Turner | |
| 2006/0152045 A1 * | 7/2006 | Okajima | B62J 1/08 297/215.1 |
| 2007/0063554 A1 * | 3/2007 | Liao | B62J 1/08 297/195.1 |
| 2009/0066124 A1 * | 3/2009 | Pirovano | B62J 1/08 297/195.1 |
| 2009/0174237 A1 * | 7/2009 | Chen | B62J 1/08 297/215.13 |
| 2010/0052377 A1 * | 3/2010 | Hsu | B62J 1/08 297/215.14 |
| 2010/0244509 A1 * | 9/2010 | Chang | B62J 1/08 297/215.15 |
| 2011/0257848 A1 | 10/2011 | Shirai | |
| 2012/0104221 A1 | 5/2012 | Hsu | |
| 2012/0243931 A1 | 9/2012 | Hsu | |
| 2013/0093231 A1 | 4/2013 | Hsu | |
| 2013/0113242 A1 | 5/2013 | Connors | |
| 2013/0119719 A1 * | 5/2013 | Bigolin | B62J 1/08 297/215.14 |
| 2013/0221713 A1 | 8/2013 | Pelot et al. | |
| 2013/0228668 A1 * | 9/2013 | D'Aluisio | B62J 1/08 248/629 |
| 2013/0327916 A1 | 12/2013 | Muff | |
| 2014/0013875 A1 | 1/2014 | Neeley | |
| 2014/0239682 A1 * | 8/2014 | Tisue | B62J 1/08 297/215.14 |
| 2014/0308071 A1 * | 10/2014 | Darley | B62J 1/08 403/322.4 |
| 2015/0034779 A1 | 2/2015 | McAndrews et al. | |
| 2015/0232142 A1 | 8/2015 | Shirai | |
| 2015/0239516 A1 * | 8/2015 | Nelson | B62J 1/08 297/215.15 |
| 2016/0009326 A1 | 1/2016 | Lin et al. | |
| 2016/0023702 A1 * | 1/2016 | Lin | B62J 1/08 297/215.15 |
| 2017/0106928 A1 | 4/2017 | Madau et al. | |
| 2017/0166275 A1 * | 6/2017 | McPherson | B62J 45/415 |
| 2018/0015976 A1 * | 1/2018 | Hermansen | B62J 1/08 |

FOREIGN PATENT DOCUMENTS

| | | |
|---|---|---|
| WO | WO2016029301 | 3/2016 |
| WO | WO2016113673 | 7/2016 |

* cited by examiner

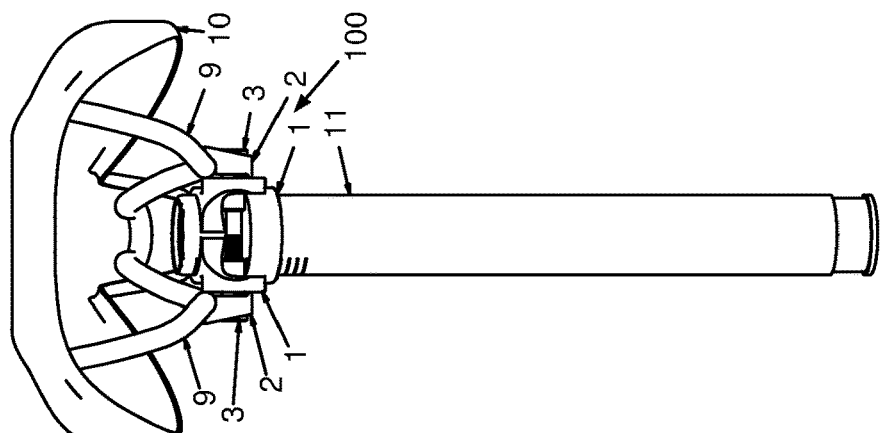
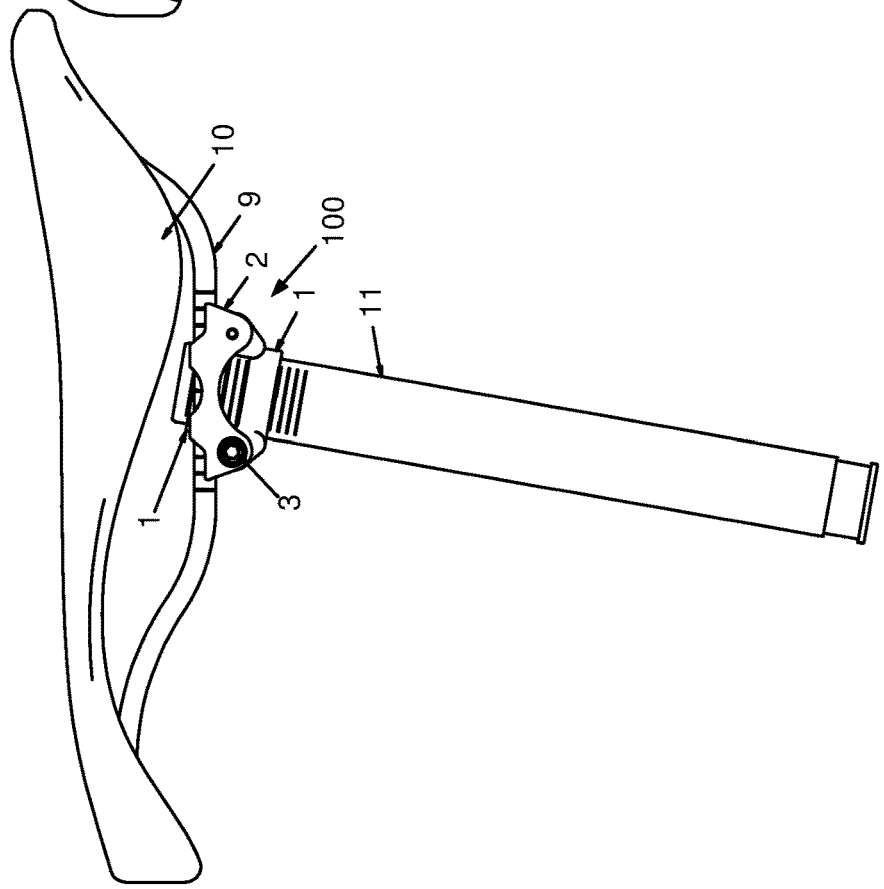
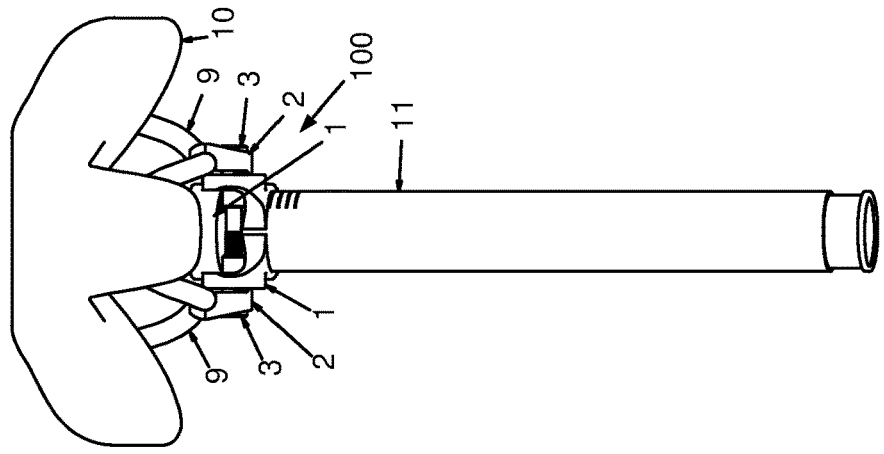

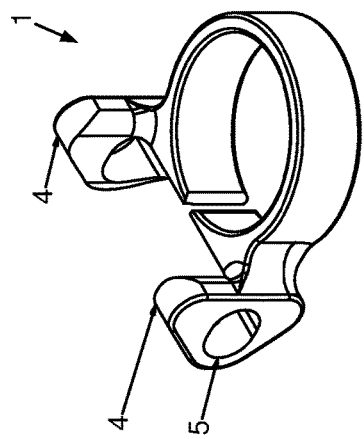
Fig. 4C
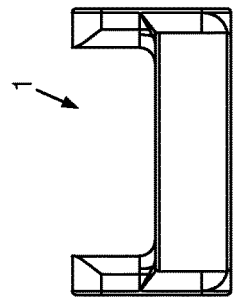
Fig. 4F
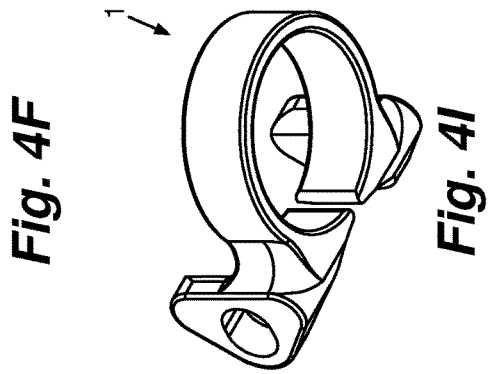
Fig. 4I
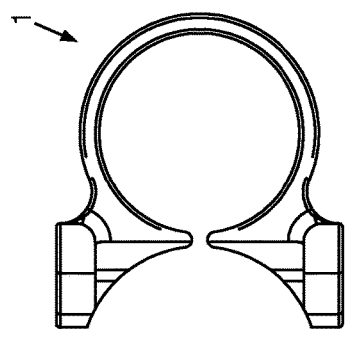
Fig. 4B
Fig. 4E
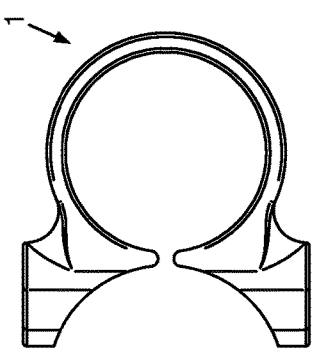
Fig. 4H
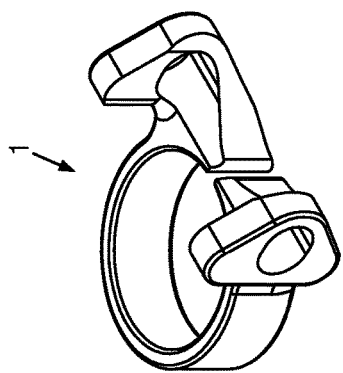
Fig. 4A
Fig. 4D
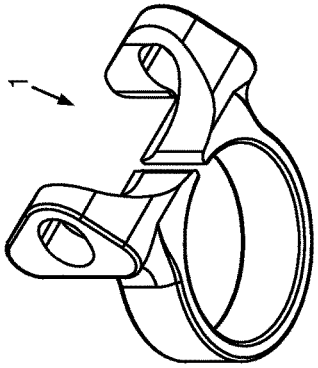
Fig. 4G

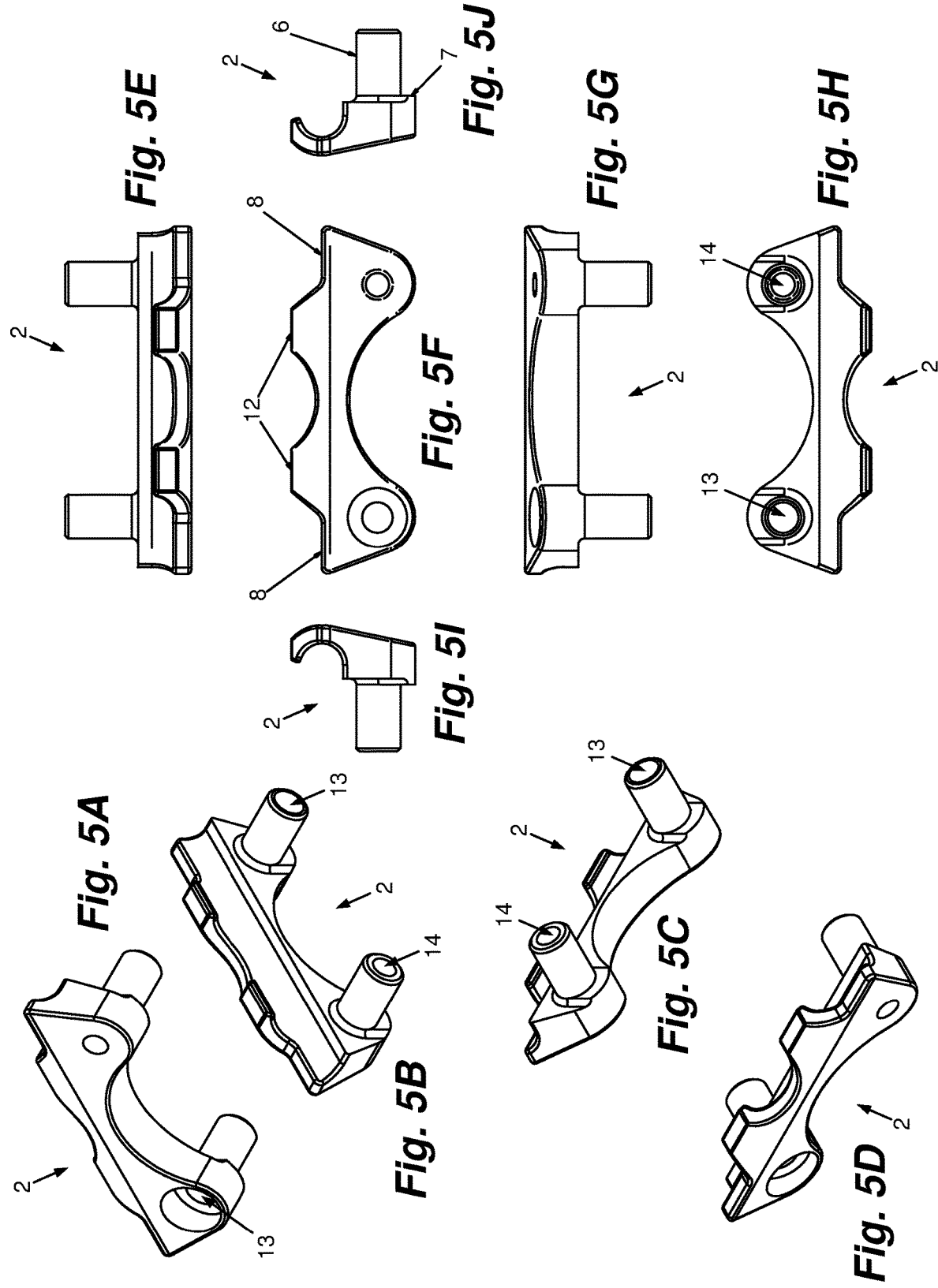

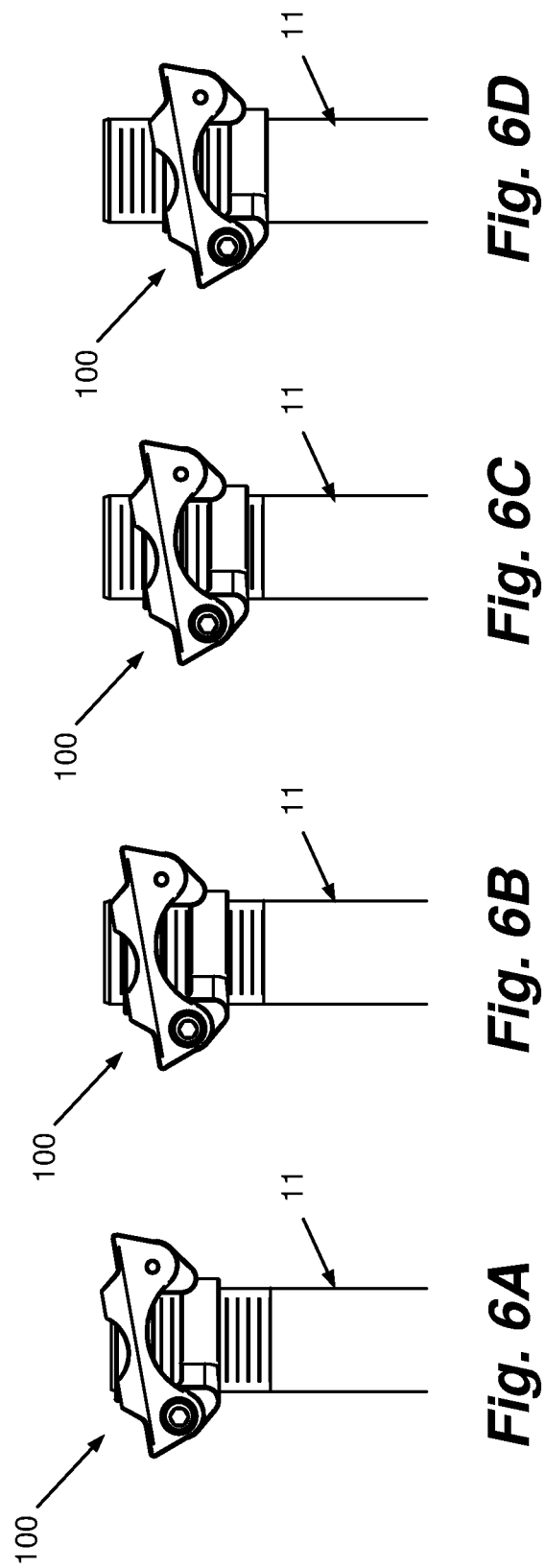

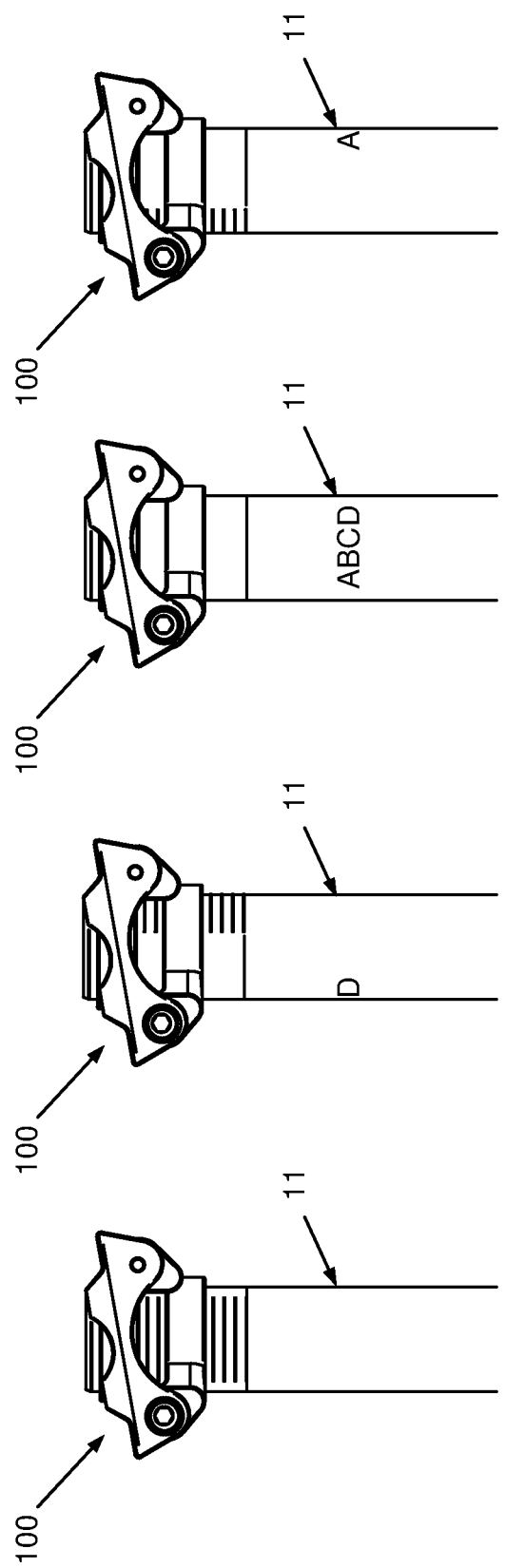

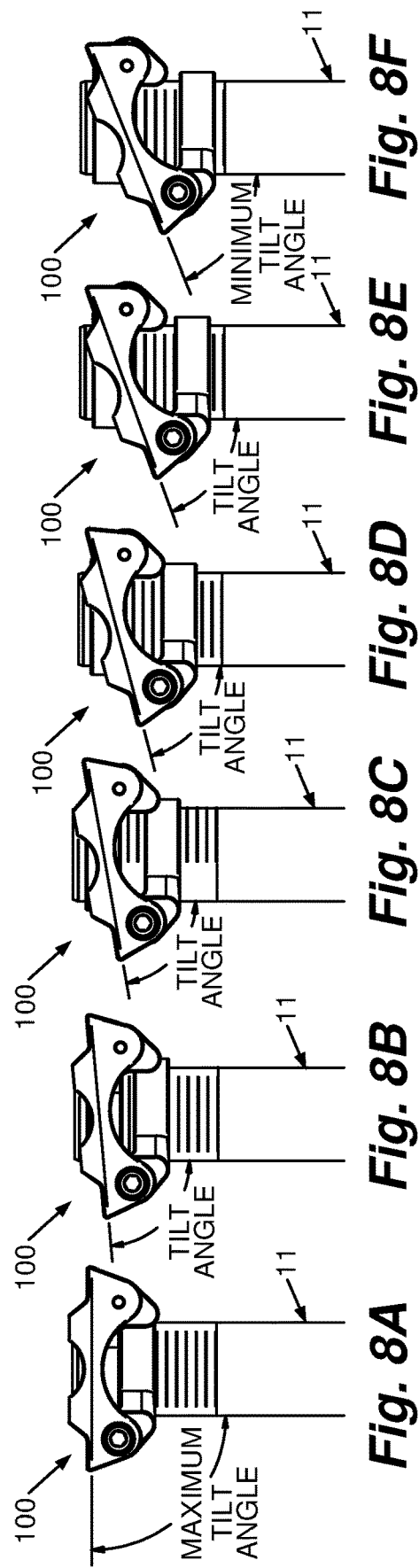

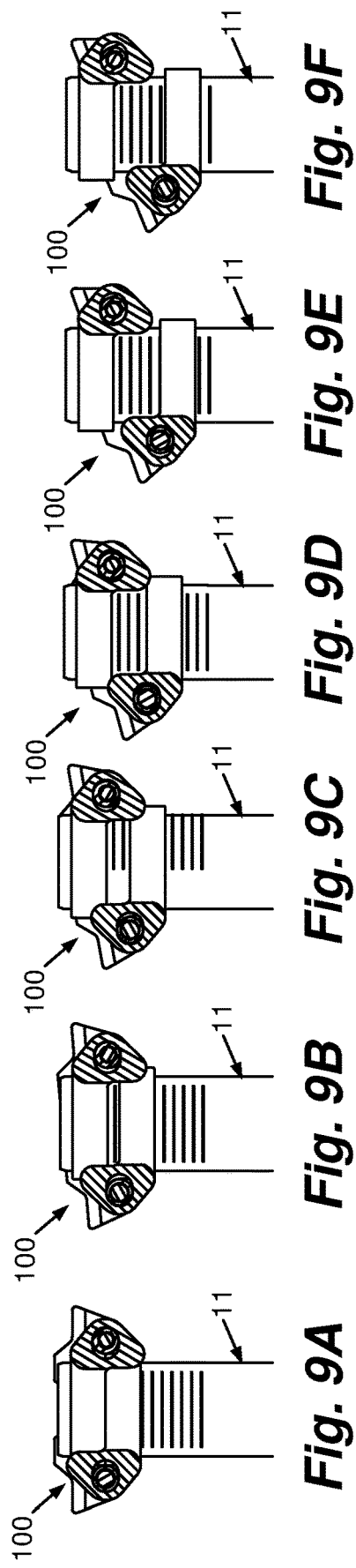

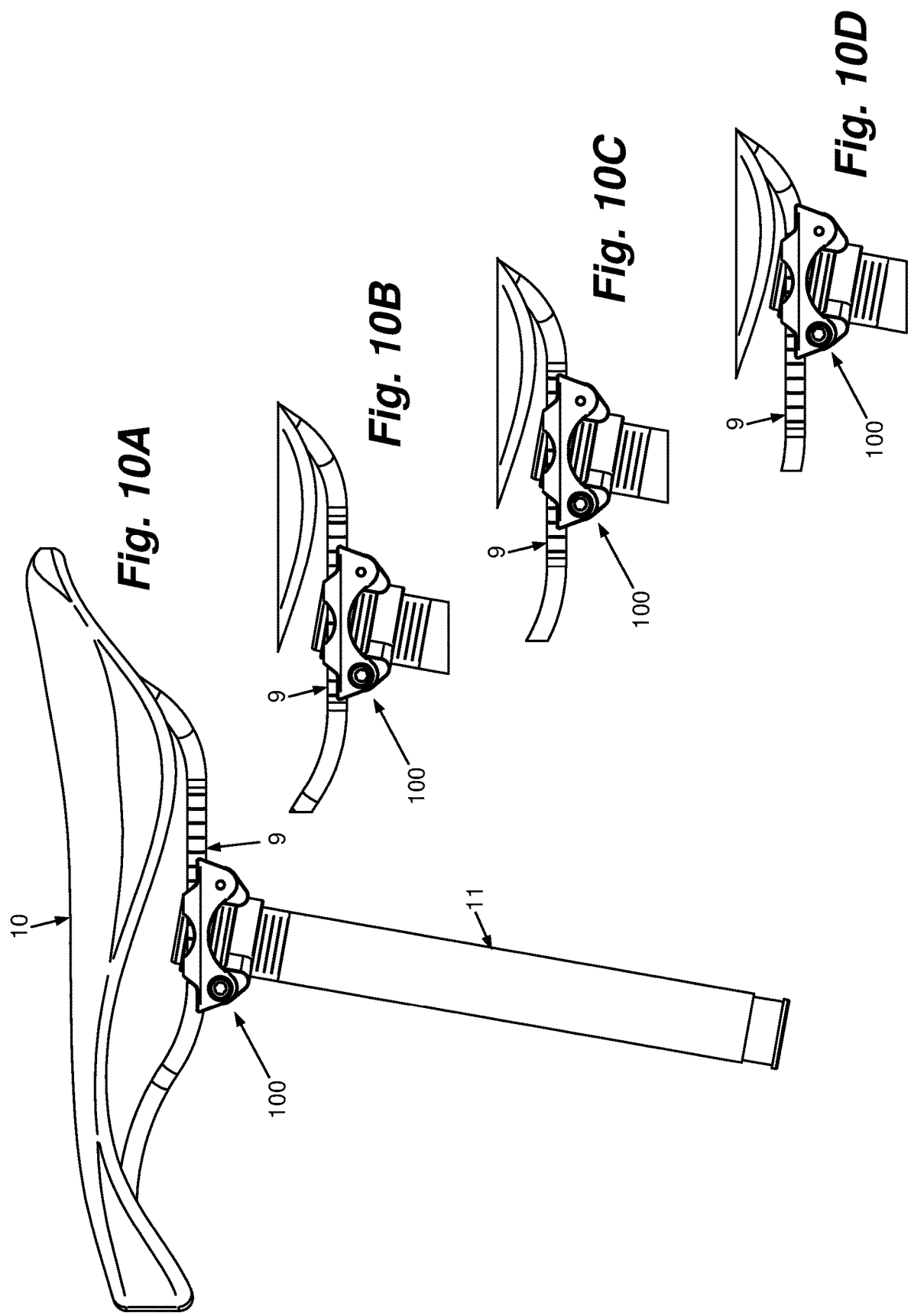

SECTION A-A

SECTION A-A

SECTION B-B

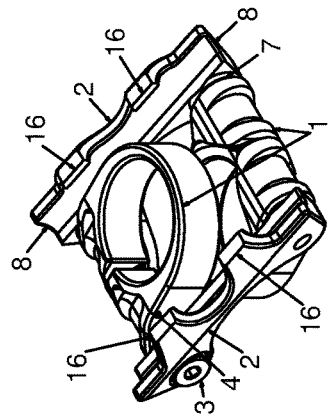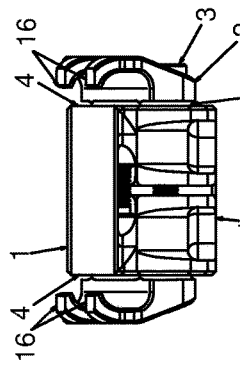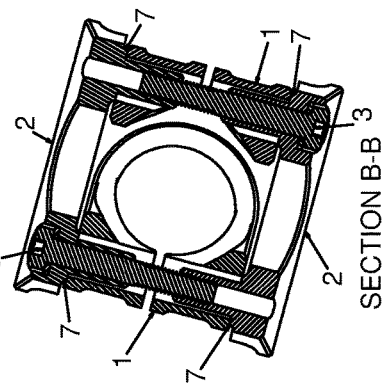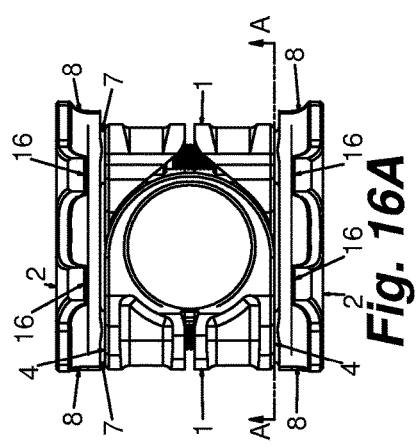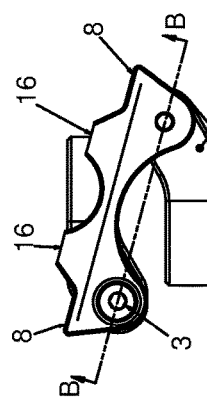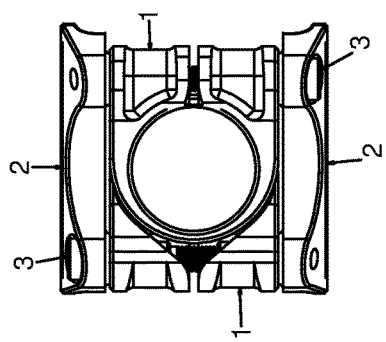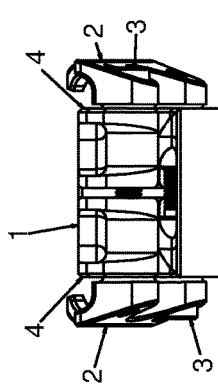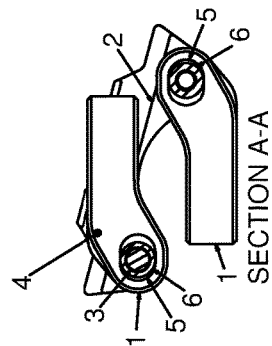

SADDLE CLAMP

CROSS-REFERENCE TO RELATED APPLICATIONS

This application claims priority under 35 U.S.C. § 119(e) to U.S. Provisional Patent Application Ser. No. 62/651,379 filed on Apr. 2, 2018, and incorporated herein by reference.

TECHNICAL FIELD

This instant specification relates to bicycle saddle clamps (or the like—unicycle, motorcycle, etc.). More specifically, this disclosure relates to mounting saddle rails to a seatpost/stanchion tube or simply a round tube.

BACKGROUND

In the search to save weight and simplify adjustment of the saddle position with respect to the seatpost, many different saddle clamp designs have been implemented in the past. Most modern saddle clamp designs use some sort of three-piece u-shaped head, one part of which is permanently attached to the top of the seatpost or integral as one piece with the seatpost. This increases manufacturing complexity and adds weight due to the interface being made more robust with more material. This fixed head design also has limitations. In the case of a dropper (height-adjustable) seatpost with this type of head, the stanchion tube cannot be withdrawn through the lower tube because the head is larger than the ID (inner diameter) of the lower tube. This prevents the assembly/disassembly of the stanchion through the bottom of the lower tube, requiring the stanchion to be inserted and removed from the top of the lower tube. This greatly constrains the architectural choices for the dropper mechanism inside the seatpost.

Another drawback to the fixed head type arrangement is that it lacks the ability to adjust the length of the stanchion tube by cutting from the same end as the clamp. Such adjustment becomes beneficial for shortening the overall length of the seatpost. In the case of a dropper seatpost, the lower end of the stanchion tube typically cannot be cut and since the head is permanently affixed, the upper end cannot be cut either. Therefore, to trim the length of a seatpost, the cut is made on the lower tube.

Yet another drawback to the fixed head type arrangement is that the only way to adjust the height of the seatpost is to make the adjustment at the post clamp, rather than the saddle clamp. This means that the entire seatpost is raised or lowered out of the frame in order to get the proper height adjustment. In the case of a dropper seatpost, it may be desirable to keep the lower tube as far in the frame as possible (to maximize the dropper travel) in order that the saddle can be lowered as far as possible. If one had to make the height adjustment by clamping the lower tube partly extended out of the frame, this reduces the amount the saddle can be ultimately lowered.

SUMMARY

The present disclosure is generally related to a saddle clamp that can be removed from the stanchion tube for service of the post or trimming of the stanchion, is lighter weight, and/or is more adjustable. The systems and techniques described here may provide one or more of the following advantages:

1. Four degrees of adjustability (adds two extra degrees of adjustability over conventional saddle clamp designs—height and rotation):
   a. Height (with respect to the seatpost, allowing the seatpost, such as a dropper seatpost, to remain in fixed height position with respect to the bicycle frame)
   b. Rotation (saddle clamp with respect to the seatpost/stanchion tube and the bicycle frame)
   c. Tilt (saddle rails with respect to the seatpost/stanchion tube and the bicycle frame)
   d. Offset (reach—distance fore/aft with respect to the seatpost/stanchion tube and the bicycle frame)
2. Detachable (for service, adjustment, cleaning, and seatpost/stanchion trimming)
3. Fewer parts (symmetrical design may use only two unique parts—not including screws)
4. Light weight (fewer components and minimal material strategically placed for strength)
5. Tightening screws both secures saddle rails to clamp and clamp to seatpost/stanchion. May use only two screws resulting in a lighter weight. Further weight savings may be achieved using different materials (e.g., titanium hardware).
6. Extra-long support under the rail and maximized fore/aft adjustment (setback support)
7. Reference scale (markings on seatpost/stanchion)
8. Clamp adjustment away from stanchion tube (which may prevent accidental scratching of stanchion with tools such as a torque wrench or hex key)
9. Independent adjustment vs. tightening of hardware The details of one or more implementations are set forth in the accompanying drawings and the description below. Other features and advantages will be apparent from the description and drawings.

BRIEF DESCRIPTION OF THE DRAWINGS

FIGS. 1A, 1B, and 1C are front, side, and rear views, respectively, illustrating an example of a saddle clamp in accordance with the present disclosure installed on a seatpost and a saddle mounted to the seatpost with the saddle clamp.

FIGS. 4A, 4B, 4C, 4D, 4E, 4F, 4G, 4H, and 4I illustrate views of an example of a post clamp of a saddle clamp in accordance with the present disclosure.

FIGS. 5A, 5B, 5C, 5D, 5E, 5F, 5G, 5H, 5I, and 5J illustrate views of an example of a rail clamp of a saddle clamp in accordance with the present disclosure.

FIGS. 6A, 6B, 6C, and 6D illustrate an example of height adjustment of a saddle clamp in accordance with the present disclosure illustrating non-indexed, infinite adjustability.

FIGS. 7A, 7B, 7C, and 7D illustrate an example of rotation adjustment of a saddle clamp in accordance with the present disclosure illustrating non-indexed, infinite adjustability.

FIGS. 8A, 8B, 8C, 8D, 8E, and 8F and illustrate an example of tilt adjustment of a saddle clamp in accordance with the present disclosure illustrating non-indexed, infinite adjustability.

FIGS. 9A, 9B, 9C, 9D, 9E, and 9F illustrate an example of a purpose of slots in the post clamp to allow tilt adjustment.

FIGS. 10A, 10B, 10C, and 10D illustrate an example of offset (reach) adjustment of a saddle clamp in accordance with the present disclosure illustrating non-indexed, infinite adjustability.

FIGS. 16A, 16B, 16C, 16D, 16E, 16F, 16G, and 16H illustrate views of another example of a saddle clamp in accordance with the present disclosure.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure.

Overall Assembly Composition

Figure 2B:
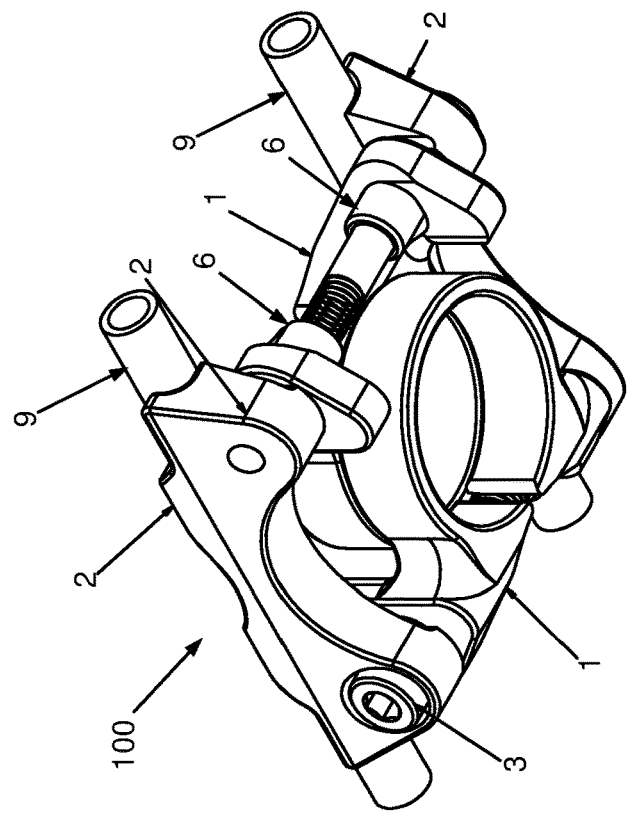
FIGS. 2A and 2B are top and bottom isometric views, respectively, illustrating an example of a saddle clamp assembly in accordance with the present disclosure.
Figure 2A:
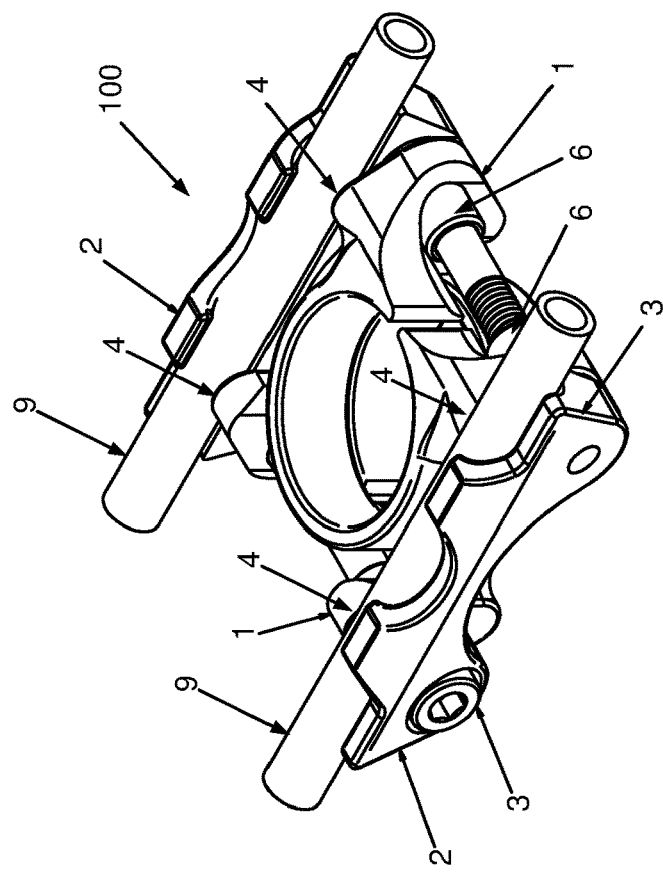
Figure 3A:
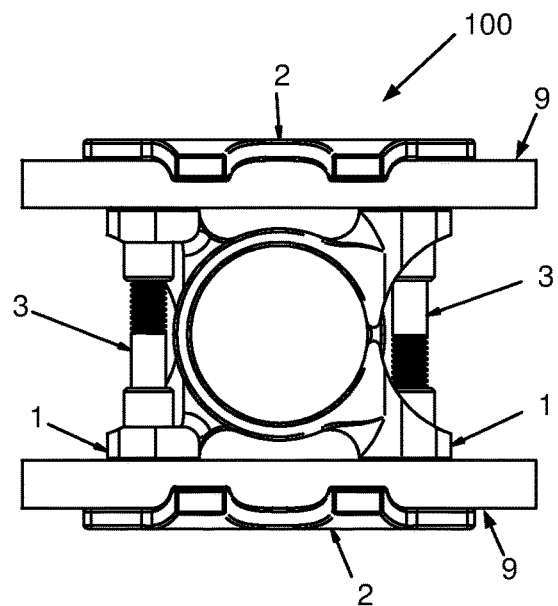
FIGS. 3A, 3B, 3C, and 3D are top, side, end, and bottom orthographic views, respectively, illustrating an example of a saddle clamp assembly in accordance with the present disclosure.
Figure 3B:
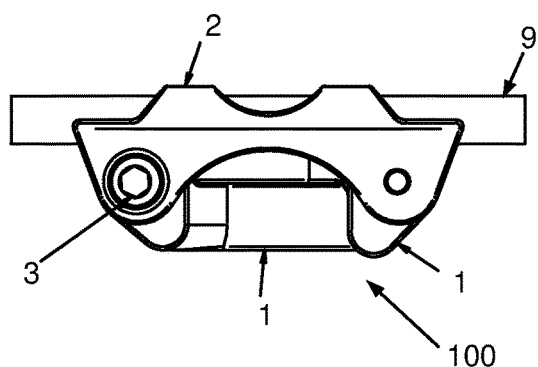
Figure 3C:
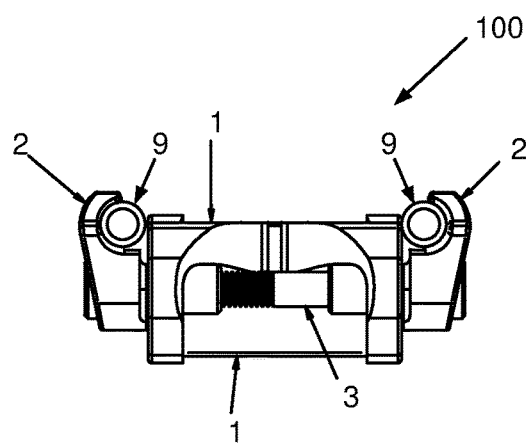
Figure 3D:
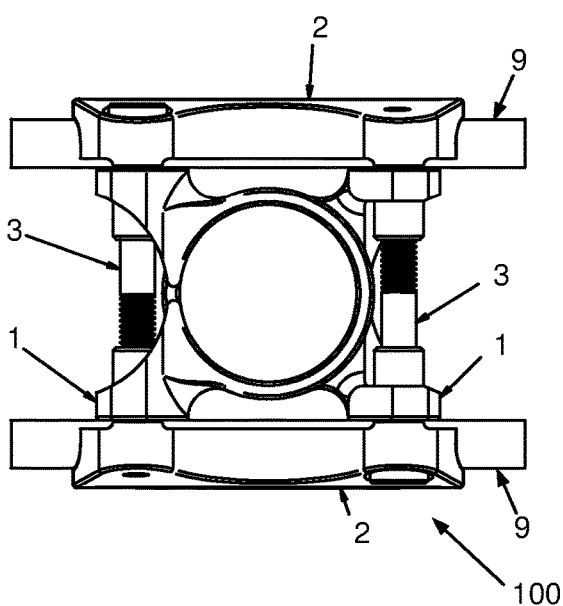

With reference, for example, to FIGS. 1A, 1B, 1C, 2A, 2B, 3A, 3B, 3C, 3D, the saddle clamp 100 includes two post clamps 1, two rail clamps 2, and two threaded fasteners (screws 3)—six parts total. In examples, the post clamps 1 and rail clamps 2 are symmetrically designed so that the parts can be used in multiple orientations. This may simplify manufacturing and may reduce confusion of how to orient these parts during installation/assembly.

Post Clamp Part Description

With reference, for example, to FIGS. 1A, 1B, 1C, the two post clamps 1 stack and nest on top of each other and clamp around the seat post/stanchion tube 11. In examples, the same post clamp 1 can be used for either the top or the bottom position. The position of the post clamps 1 with respect to the seatpost can vary with two degrees of freedom. In the first degree of freedom, the post clamps 1 are allowed to slide axially along the seatpost. In the second degree of freedom, the post clamps 1 are allowed to rotate on the axis of the seatpost. The two post clamps 1 can be independently positioned on the seat post/stanchion tube 11 with respect to each other. Once installed with the rail clamps 2, the post clamps 1 are rotationally aligned with each other such that the back of one post clamp 1 is directly under the front of the other, and the back of the other post clamp 1 is directly above the front of the other.

With reference, for example, to FIGS. 2A, 2B, 3A, 3B, 3C, 3D, 4A, 4B, 4C, 4D, 4E, 4F, 4G, 4H, 4I, 5A, 5B, 5C, 5D, 5E, 5F, 5G, 5H, 5I, 5J the post clamps 1 have post clamp wings 4 that provide a surface for the saddle rails 9 to be clamped against. These post clamp wings 4 are shaped in such a way as to maintain surface contact with the saddle rails 9 throughout the tilt adjustment range of the saddle clamp 100. In examples, the shape of the post clamp wings 4 also allows for the post clamps 1 to be used as a top or bottom post clamp 1.

Within the post clamp wings 4 are post clamp slots 5 that receive the rail clamp shoulders 6 (described below). When the post clamps 1 are positioned against each other, the post clamp slots 5 of each post clamp 1 are primarily aligned across from each other. This allows the rail clamps 2 to be positioned perpendicular to the seat post/stanchion tube 11 (the maximum tilt adjustment angle). There can be variation in this design. The post clamp slots 5 do not have to be straight or perpendicular to the seat post/stanchion tube 11 axis—they can be a curved slot or angled slot. A curve or angled slot will affect the ratio of tilt to distance between the post clamps 1. Also, a perpendicular maximum tilt adjustment angle is not mandatory, and the post clamps 1 and post clamp slots 5 can be configured in such a way that the maximum tilt adjustment angle is more or less than perpendicular. In examples, the post clamp wings 4 are configured in such a way as to allow the post clamps 1 to nest/overlap within each other at the maximum tilt adjustment angle.

Rail Clamp Part Description

With reference, for example, to FIGS. 2A, 2B, 3A, 3B, 3C, 3D, 4A, 4B, 4C, 4D, 4E, 4F, 4G, 4H, 4I, 5A, 5B, 5C, 5D, 5E, 5F, 5G, 5H, 5I, and 5J the rail clamps 2 have rail clamp shoulders 6 that insert into the post clamp slots 5. These rail clamp shoulders 6 are allowed to slide and rotate within the post clamp slot 5, but the post clamp slot 5 constrains motion of the rail clamps 2 to the path of the slot. Per rail clamp 2, one rail clamp shoulder 6 is threaded (with a threaded hole 14), and the other rail clamp shoulder 6 has a thru hole 13. When installed in the post clamp slots 5 of the post clamps 1, opposite each other, the threaded hole 14 of one rail clamp 2 axially aligns with the thru hole 13 of the other rail clamp 2. This allows for a screw 3 to be installed through the thru hole 13 in one rail clamp 2 and threaded into the threaded hole 14 in the other rail clamp 2. Tightening the screw 3 draws the assembly together, clamping the saddle rails 9 between the rail clamps 2 and the post clamp wings 4 and clamping the post clamps 1 to the seat post/stanchion tube 11. The rail clamp shoulders 6 also transfer the load from the saddle 10, through the rail clamps 2, and onto the post clamps 1. The rail clamp shoulders 6 provide a load bearing surface that interfaces with the post clamp slot 5 surface in the post clamps 1. The rail clamp shoulders 6 also allow for a precision fit into the post clamp slots 5—constraining the position of the rail clamps 2 with respect to the post clamps 1.

Because the clamping force of the screw 3 is offset from the resulting clamping force on the saddle rail 9, a clamping moment exists. Therefore, in examples, the rail clamp 2 has a rail clamp foot 7. This rail clamp foot 7 provides a hard stop for the rail clamp 2 against the post clamp wing 4 and serves to counteract the tightening moment applied by the saddle rail 9 against the rail clamp 2. The rail clamp foot 7 reduces the bending moment acting upon the rail clamp shoulder 6 and screw 3.

In examples, the rail clamps 2 have a wide fore/aft setback support 8. This allows for maximum fore/aft position of the saddle rails 9 with respect to the saddle clamp/saddle clamp assembly 100. The wide support reduces the bending load on the saddle rails 9. Yet, the rail clamp fingers 12 on top of the rail clamp 2 are closer together. Close rail clamp fingers 12 allow the natural bend in the saddle rail 9 to be positioned closer to the midpoint of the saddle clamp 100. This, in turn, allows a greater adjustment difference between fore/aft position and more utilization of the straight portion of the saddle rail 9. As the saddle 10 is moved to the extreme fore or aft, the wide fore/aft setback support 8 ensures the saddle rail 9 is supported.

Assembly/Installation

With reference, for example, to FIGS. 1A, 1B, 1C, 2A, 2B, 3A, 3B, 3C, 3D, when the rail clamps 2 are attached to the post clamps 1 with screws 3, this ties all six pieces together into one saddle clamp/saddle clamp assembly 100. When installed on a seat post/stanchion tube 11, tightening both screws 3 secures the saddle rails 9 to the saddle clamp assembly 100 and the saddle clamp assembly 100 to the seat post/stanchion tube 11. The saddle clamp assembly 100 can be loosely assembled without the seat post/stanchion tube 11 and can be slid on and off the seat post/stanchion tube 11 as a unit. The saddle clamp assembly 100 can be completely removed from the seat post/stanchion tube 11. Once properly adjusted and tightened, the saddle clamp assembly 100 is fixed to the seatpost/stanchion tube 11 with friction. The seat post/stanchion tube 11 needs no extra feature, such as a shoulder for the saddle clamp 100 to stop against, in order to secure the assembly. This provides a manufacturing advantage as the complexity of the seat post/stanchion tube 11 can be reduced over conventional designs. The area in which the saddle clamp assembly 100 is installed, may or may not have a surface finish to increase holding friction.

The area of the seat post in which the saddle clamp assembly 100 is installed may have markings that can be used for positional reference of the saddle clamp assembly 100 with respect to the seat post/stanchion tube 11. These markings may designate a clamp zone or a "keep out" zone. For example, if the saddle clamp assembly 100 is installed on a dropper seatpost stanchion tube 11, to prevent the saddle clamp 100 from crashing into the wiper seal or other seat post component when operated, the saddle clamp 100 should not be installed in the travel region of the stanchion tube 11. The markings may designate the safe region of the stanchion tube 11 in which the saddle clamp 100 can be installed without interference of the post operation.

To aid in assembly/disassembly, in examples, the rail clamp shoulders 6 are designed to be long enough to allow the screws 3 to be unscrewed and the rail clamps 2 to be drawn out enough to allow the insertion/removal of the saddle 10 into the saddle clamp assembly 100 without the screws 3 being completely removed or the rail clamp shoulder 6 coming out of the post clamp slot 5 (i.e., the saddle clamp assembly falling apart while working with it).

Also, to aid in assembly/disassembly, in examples, the post clamps 1 are designed such that they naturally clamp around the seat post with enough friction to hold position without tightening the screws 3, but still easy to move by hand. This allows for convenient and easy positioning of the saddle 10 and then tightening of the saddle 10 in place. The position of the saddle 10 is not affected by tightening of the screws 3 (unlike some traditional clamp designs). Therefore, it is possible to independently position the saddle 10 and, in a separate operation, tighten the saddle clamp assembly 100.

As the saddle clamp assembly 100 is secured by tightening the screws 3, the rail clamps 2 are drawn tight against the saddle rails 9. As the screws 3 continue to be tightened, the saddle rails 9 are drawn against the post clamp wings 4. This secures the saddle rail 9 between the rail clamp 2 and the post clamp 1. Because of friction, the saddle rails 9 cannot move along their axis (offset adjustment, explained later, is now fixed in position). Nor can the saddle 10 be moved laterally in the saddle clamp assembly 100.

As the screws 3 continue to be tightened, the tension force is transferred to the post clamp wings 4, drawing them toward each other. The post clamp wings 4 transfer the clamping force of the rail clamps 2 to a clamping force of the post clamp 1 around the seat post/stanchion tube 11. This secures the post clamp 1 to the seat post/stanchion tube 11. Friction between the post clamps 1 and the seat post/stanchion tube 11 holds the post clamps 1 in position and thus the rest of the saddle clamp assembly 100 is held in position.

Adjustment

When the screws 3 are loosened, the saddle clamp assembly 100 provides four degrees of adjustability: height, rotation, tilt, and offset. Most saddle clamps only allow for two degrees of adjustability: tilt and offset, with the other two degrees of adjustability handled at the post clamp on the bicycle frame. With the saddle clamp assembly 100, all four of these degrees of adjustability can be made at the saddle clamp assembly 100 itself.

With reference, for example, to FIGS. 6A, 6B, 6C, 6D, height of the saddle clamp 100 is adjusted by moving the saddle clamp assembly 100 along the axis of the seat post/stanchion tube 11. This provides an advantage over other clamp designs in that the height adjustment does not have to be made at the bicycle frame's post clamp. For dropper seatposts, the extra height adjustment allows one to maximize the amount of drop travel they can fit into their frame. This enables the lower tube of the dropper seatpost to be more fully inserted into the frame. It also broadens the effective height range in which a dropper seatpost of certain travel can be used. The amount of adjustability is a function of the allowable clamping zone on the seat post/stanchion tube 11 (as marked) and the room under the saddle 10 for the seat post/stanchion tube 11 to reside. Note, in examples, as the tilt angle (discussed further below) is adjusted, the distance between the post clamps 1 will also affect the amount of available height adjustment.

The ability to adjust the height of the saddle clamp 100 also allows for the ability to trim off the top of a seat post/stanchion tube 11. This can be a benefit in customizing fit and reducing weight of the seat post/stanchion tube 11. This may also reduce manufacturing costs since one size can be made to fit many.

With reference, for example, to FIGS. 7A, 7B, 7C, 7D, the clamping arrangement of the saddle clamp 100 also provides the ability to adjust the rotation of the saddle clamp 100 with respect to the seat post/stanchion tube 11. This allows the seat post to be secured in the bicycle frame without regard to orientation of the saddle clamp assembly 100. This becomes an advantage to dropper seatposts which utilize a specific orientation to the bicycle frame when installed. As saddle clamp assembly 100 is free to rotate, saddle clamp assembly 100 eliminates the need for indexing of the dropper seatpost assembly parts to each other. This may simplify manufacturing and may reduce cost. With the two clamp screws 3 loosened, the saddle clamp assembly 100 can be rotated as one piece on the seat post/stanchion tube 11.

With reference, for example, to FIGS. 8A, 8B, 8C, 8D, 8E, 8F, 9A, 9B, 9C, 9D, 9E, 9F, tilt of the saddle clamp 100 is adjusted by moving the post clamps 1 to/from each other, specifically by changing the distance between the post clamp slots 5. In examples, as one post clamp 1 moves downward and the other post clamp 1 moves upward along the axis of the seat post/stanchion tube 11, the angle between the two post clamp slots 5 changes, thus the angle of the rail clamps 2, saddle rail 9 and saddle 10 changes. In examples, the distance between the rail clamp shoulders 6 is fixed, but as the distance between the post clamps 1 changes, so does the distance between the post clamp slots 5. The post clamp slots 5 allow for variation in this distance and thus can accommodate the fixed distance between rail clamp shoulders 6. In examples where slots are used (rather than a pin/slot arrangement), when the tilt adjustment angle is any greater than the minimum tilt adjustment angle, the rail clamps 2 have room to move slightly fore/aft (this is not specifically designed to provide fore/aft offset adjustment—offset adjustment is discussed below). This amount of play in the assembly is acceptable and is noticed only when the saddle clamp assembly 100 is loose and is eliminated once the saddle clamp assembly 100 is tightened.

With reference, for example, to FIGS. 10A, 10B, 10C, 10D, offset of the saddle clamp 100 is adjusted by loosening the clamp screws 3 and sliding the saddle 10 along the axis of the saddle rails 9. The amount of offset is determined by the rail clamp fingers 12 and the geometry of the saddle rails 9. In examples, the rail clamps 2 are designed to maximize the fore/aft adjustment of the saddle 10 by allowing the bends in the saddle rails 9 to be positioned as close to the seat post/stanchion tube 11 centerline as possible.

Figure 11B:
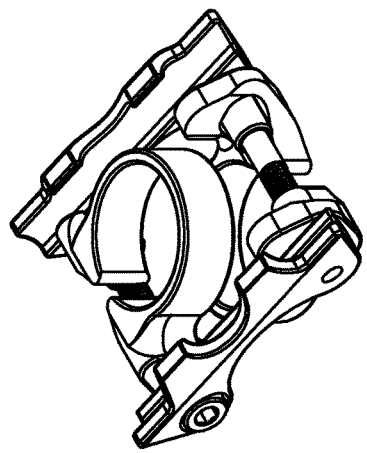
FIGS. 11A, 11B, 11C, 11D, 11E, 11F, 11G, and 11H illustrate views of another example of a saddle clamp in accordance with the present disclosure including an example of non-symmetric post clamps, pin/slot configuration.
Figure 11E:
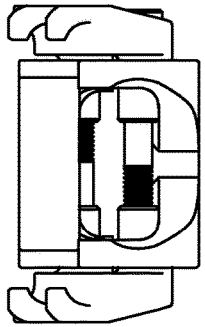
Figure 11H:
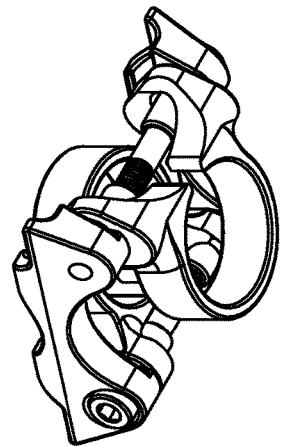
Figure 11A:
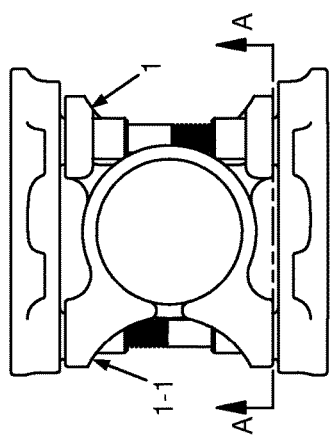
Figure 11D:
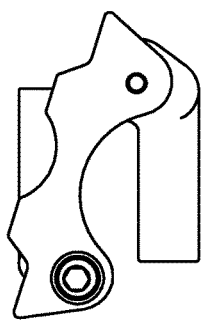
Figure 11G:
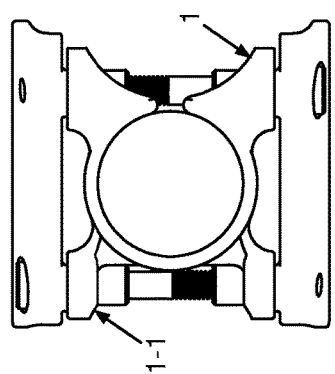
Figure 11C:
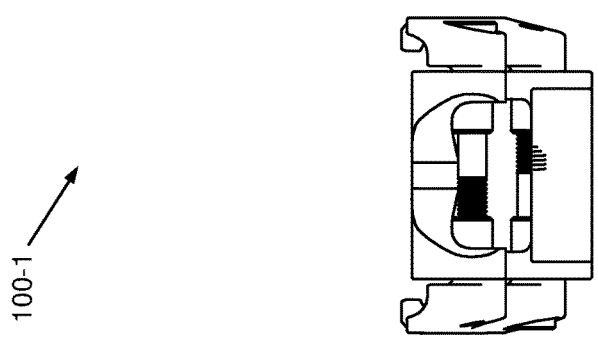
Figure 11F:
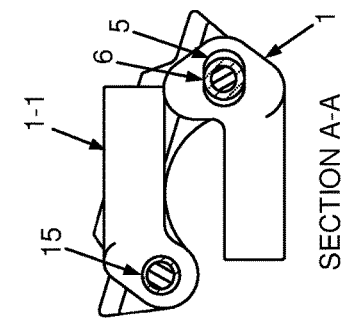

With reference, for example, to FIGS. 11A, 11B, 11C, 11D, 11E, 11F, 11G, 11H, another embodiment of the saddle clamp 100, saddle clamp 100-1, includes non-symmetric post clamps with a pin/slot configuration where one post clamp slot 5 (rail clamp shoulder 6 is free to rotate and slide) is provided in combination with one pivot joint 15 (rail clamp shoulder 6 is free to only rotate). This embodiment is a non-symmetrical design and uses two different post clamps—one post clamp 1-1 with a pivot 15 and another post clamp 1 with a post clamp slot 5.

Figure 12B:
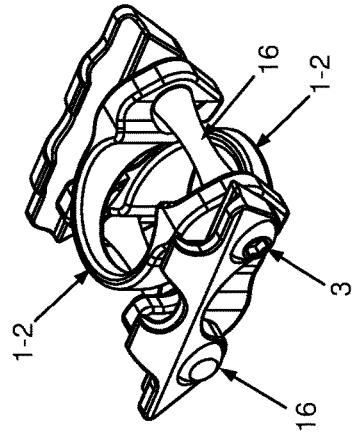
FIGS. 12A, 12B, 12C, 12D, 12E, 12F, 12G, and 12H illustrate views of another example of a saddle clamp in accordance with the present disclosure including an example of a post clamp variation.
Figure 12E:
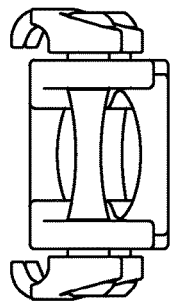
Figure 12H:
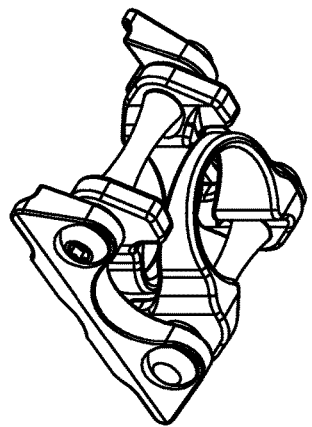
Figure 12A:
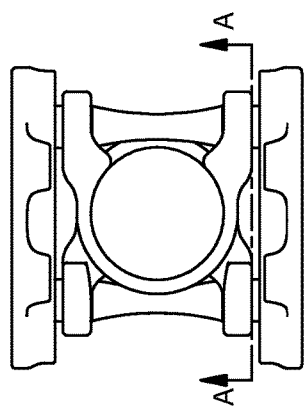
Figure 12D:
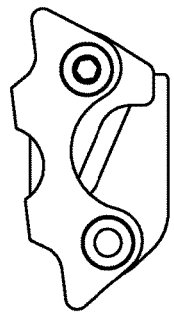
Figure 12G:
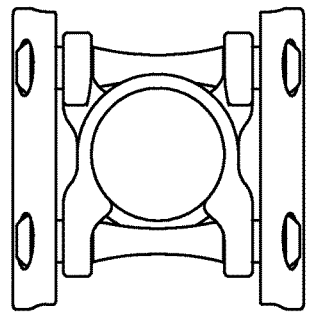
Figure 12C:
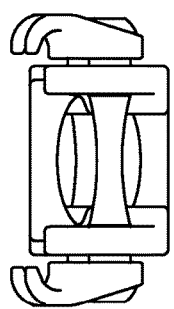
Figure 12F:
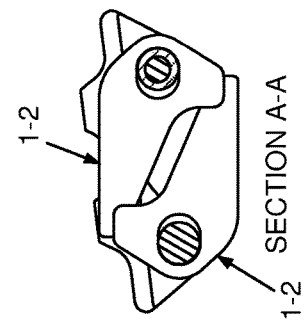

With reference, for example, to FIGS. 12A, 12B, 12C, 12D, 12E, 12F, 12G, 12H, another embodiment of the saddle clamp 100, saddle clamp 100-2, includes a post clamp variation where a pin 16 is press fit into and extended from the rail clamp 2 to provide rail clamp shoulders 6, such that the post clamp 1-2 is fit over the pin 16 and the screw 3 is threaded into the end of the pin 16.

Figure 13B:
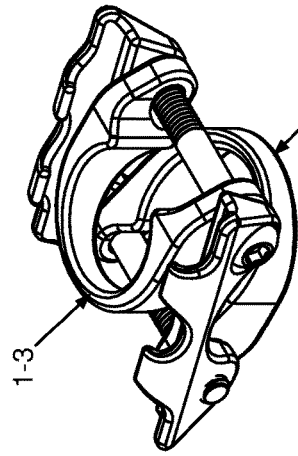
FIGS. 13A, 13B, 13C, 13D, 13E, 13F, and 13G illustrate views of another example of a saddle clamp in accordance with the present disclosure including an example of a post clamp variation.
Figure 13E:
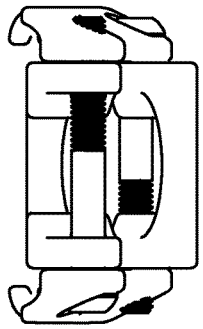
Figure 13G:
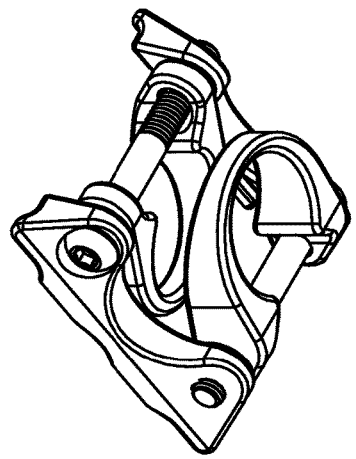
Figure 13A:
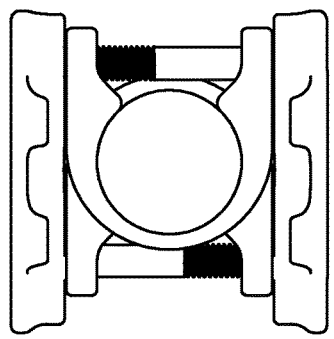
Figure 13D:
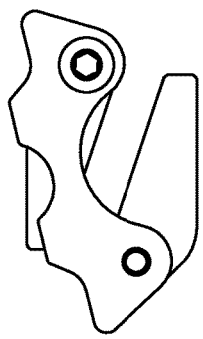
Figure 13F:
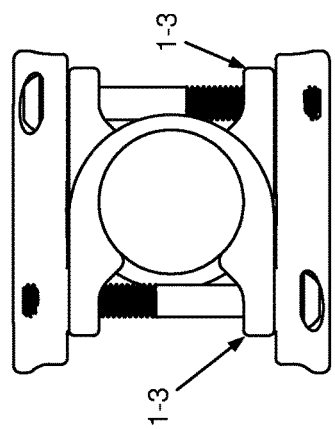
Figure 13C:
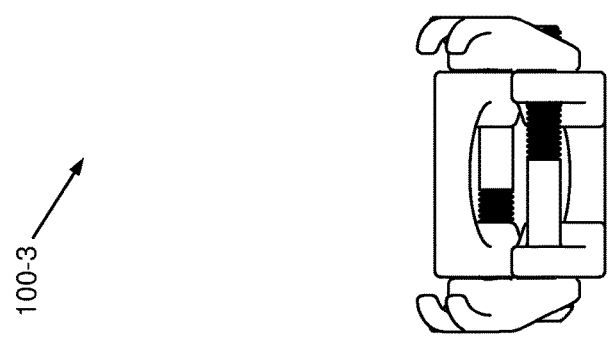

With reference, for example, to FIGS. 13A, 13B, 13C, 13D, 13E, 13F, 13G another embodiment of the saddle clamp 100, saddle clamp 100-3, includes a post clamp variation where the post clamp 1-3 provides increased clamping area on the inside of the saddle rails 9.

Figure 14B:
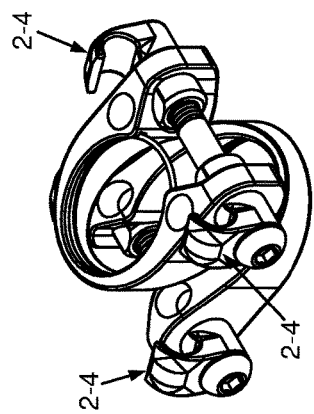
FIG. 14A, 14B, 14C, 14D, 14E, 14F, 14G, and 14H illustrate views of another example of a saddle clamp in accordance with the present disclosure including an example of discrete rail clamps.
Figure 14E:
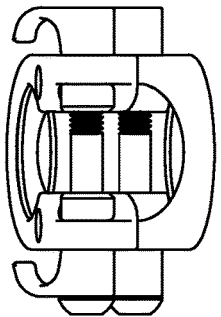
Figure 14H:
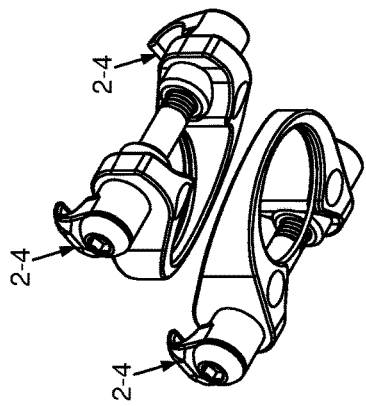
Figure 14A:
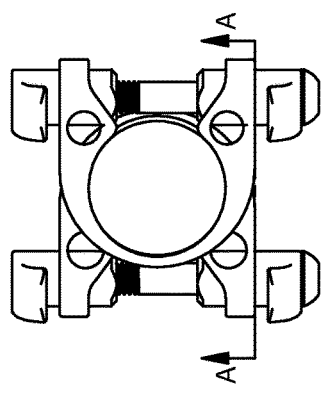
Figure 14D:
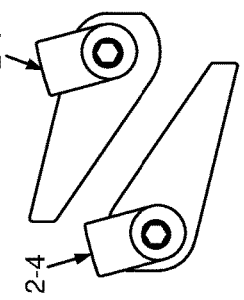
Figure 14G:
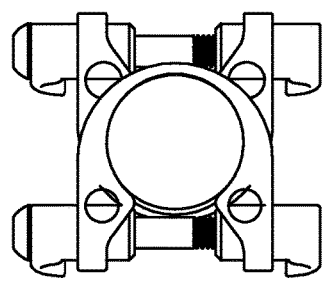
Figure 14C:
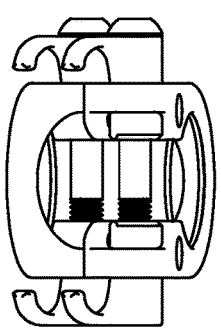
Figure 14F:
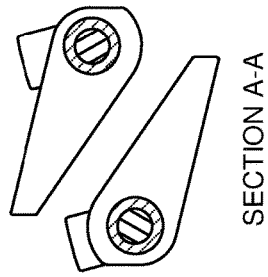

With reference, for example, to FIGS. 14A, 14B, 14C, 14D, 14E, 14F, 14G, 14H, another embodiment of the saddle clamp 100, saddle clamp 100-4, includes discrete rail clamps where a split rail clamp 2-4 (the distance between the rail clamp fingers 12 is variable) is provided. This increases the part count, however, there is a potential weight savings with this approach.

Figure 15C:
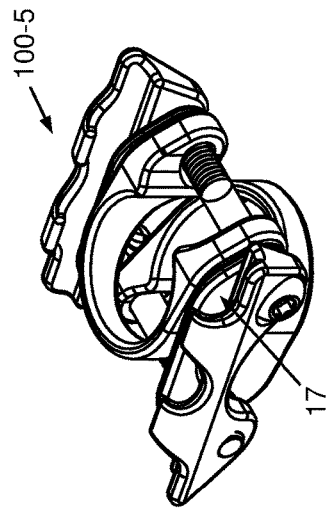
FIGS. 15A, 15B, 15C, 15D, 15E, 15F, 15G, 15H, and 15I illustrate views of another example of a saddle clamp in accordance with the present disclosure including an example of a clamp plate addition.
Figure 15F:
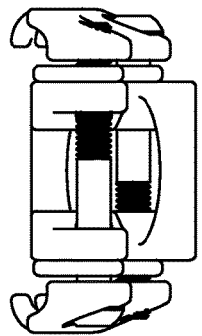
Figure 15I:
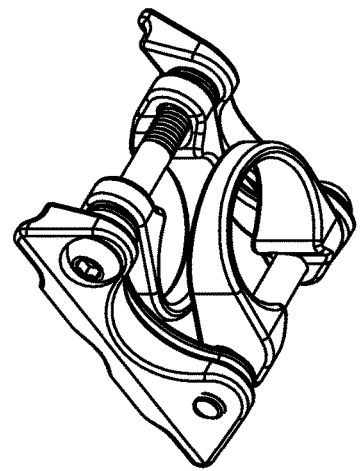
Figure 15B:
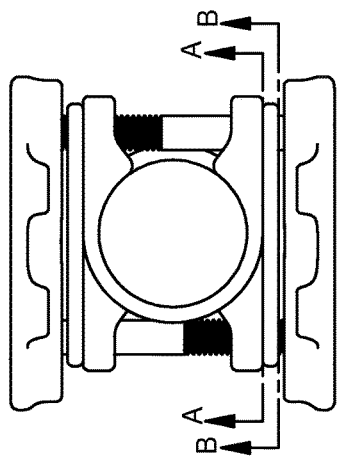
Figure 15E:
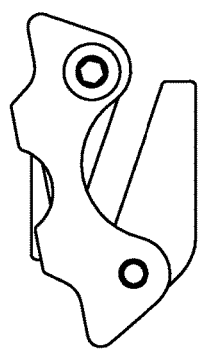
Figure 15H:
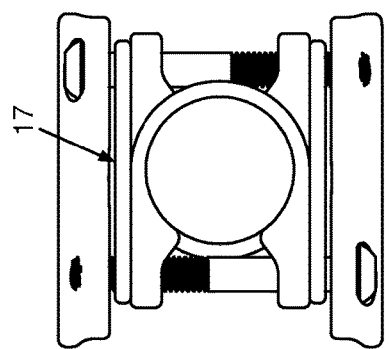
Figure 15A:
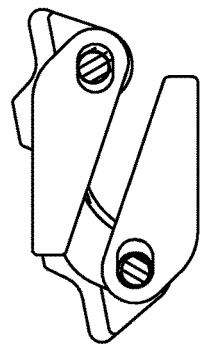
Figure 15D:
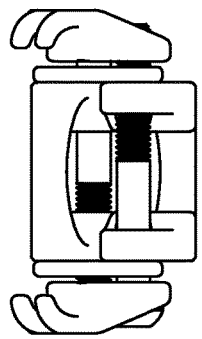
Figure 15G:
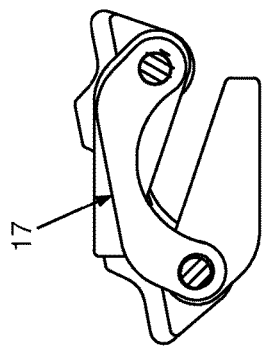

With reference, for example, to FIGS. 15A, 15B, 15C, 15D, 15E, 15F, 15G, 15H, 15I, another embodiment of the saddle clamp 100, saddle clamp 100-5, includes a clamp plate addition where a clamp plate 17 provides increased clamping area on the inside of the saddle rails 9.

With reference, for example, to FIGS. 16A, 16B, 16C, 16D, 16E, 16F, 16G, 16H, another embodiment of the saddle clamp 100, saddle clamp 100-6, is provided.

Other Features

In examples, the saddle clamp assembly 100 (including saddle clamp assembly 100-1, 100-2, 100-3, 100-4, 100-5, 100-6) has been designed to be lightweight. Material can be strategically eliminated to provide weight savings yet maintain the structural integrity of the saddle clamp assembly 100. More weight can be removed by machining away more material; however, this may increase the manufacturing complexity of the parts.

In examples, the saddle clamp 100 (including saddle clamp assembly 100-1, 100-2, 100-3, 100-4, 100-5, 100-6) has also been designed with consideration to the access of the screws 3 and proximity of the tools used to tighten the screws 3 with respect to the stanchion tube 11 of a dropper seatpost. Some conventional saddle clamp designs require tools (such as a torque wrench or hex key) to be brought very close to the stanchion tube 11 while tightening the clamp. This increases risk of scratching the stanchion tube 11 if a tool slips or is carelessly handled. A scratched stanchion tube 11 can cause a dropper seatpost to fail. With the saddle clamp 100, the tool approach is from the sides of the saddle clamp 100 such that the risk of scratching the stanchion tube 11 is minimized. It is also a more natural and ergonomic position to use a tool.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein.

FIGURE CALLOUT PART/FEATURE

100 Saddle Clamp
1 Post Clamp
2 Rail Clamp
3 Screw
4 Post Clamp Wings (feature)
5 Post Clamp Slot (feature)
6 Rail Clamp Shoulder (feature)
7 Rail Clamp Foot (feature)
8 Fore/Aft Setback Support (feature)
9 Saddle Rail (representation of)
10 Saddle
11 Seat Post/Stanchion Tube
12 Rail Clamp Fingers (feature)
13 Thru Hole
14 Threaded Hole
15 Pivot Joint
16 Pin
17 Clamp Plate
100-1 Saddle Clamp
1-1 Non-Symmetric Post Clamp, Pin/Slot Configuration
100-2 Saddle Clamp
1-2 Post Clamp (variation)
100-3 Saddle Clamp
1-3 Post Clamp (variation)
100-4 Saddle Clamp
2-4 Discrete Rail Clamp
100-5 Saddle Clamp
100-6 Saddle Clamp

The invention claimed is:
1. A saddle clamp for a bicycle, comprising:
   a rail clamp, the rail clamp comprising:
      a first rail clamp body configured to engage at least a portion of a first rail of a bicycle saddle; and
      a second rail clamp body configured to engage at least a portion of a second rail of the bicycle saddle, wherein the first and second rail clamp bodies are configured to cooperate to urge the first and second rails towards each other; and a first and a second post clamp, each post clamp configured to engage a bicycle seat post, the first and second post clamps disposed between the first and second rail clamp bodies, wherein the first and second post clamps are configured to exert a compressive force on the bicycle seat post in response to the first and second rail clamp bodies urging the first and second rails towards each other;

wherein the first post clamp is pivotally and slideably coupled to the first and second rail clamp bodies and the second post clamp is pivotally and slideably coupled to the first and second rail clamp bodies.

2. The saddle clamp of claim 1, wherein a saddle clamp angle, measured relative to a longitudinal axis of the bicycle seat post, is based, at least in part, on a longitudinal separation distance extending between the first and second post clamps.

3. The saddle clamp of claim 1, further comprising a first and a second fastener, the first fastener extending from the first rail clamp body and into the second rail clamp body, the second fastener extending from the second rail clamp body and into the first rail clamp body.

4. The saddle clamp of claim 3, wherein the first and second fasteners are threaded such that a rotation of the first and second fasteners causes the first and second rail clamp bodies to urge the first and second rails towards each other.

5. The saddle clamp of claim 4, wherein the first and second rail clamp bodies are symmetrical.

6. The saddle clamp of claim 3, wherein the first rail clamp body includes a first through-hole for receiving the first fastener and a first threaded hole for threadably coupling to the second fastener and the second rail clamp body includes a second through-hole for receiving the second fastener and a second threaded hole for threadably coupling to the first fastener.

7. The saddle clamp of claim 6, wherein the first rail clamp body includes a first plurality of shoulders extending generally towards the second rail clamp body and the second rail clamp body includes a second plurality of shoulders extending generally towards the first rail clamp body, wherein each of the first plurality of shoulders and each of the second plurality of shoulders are configured to engage a respective opening in the first and second post clamps such that the first post clamp pivots about one of the first plurality of shoulders and one of the second plurality of shoulders and the second post clamp pivots about another of the first plurality of shoulders and another of the second plurality of shoulders.

8. The saddle clamp of claim 6, wherein the first fastener extends through the first post clamp such that the first post clamp pivots about the first fastener and the second fastener extends through the second post clamp such that the second post clamp pivots about the second fastener.

9. The saddle clamp of claim 1, further comprising a first and a second fastener, the first and second fasteners extending from the first rail clamp body and into the second rail clamp body.

10. The saddle clamp of claim 9, wherein the first and second fasteners are threaded such that a rotation of the first and second fasteners causes the first and second rail clamp bodies to urge the first and second rails towards each other.

11. The saddle clamp of claim 10, wherein the first rail clamp body includes a first and a second through-hole for receiving the first fastener and the second fastener, respectively, and the second rail clamp body includes a first and a second threaded hole for threadably coupling to the first fastener and the second fastener, respectively.

12. The saddle clamp of claim 1, wherein the rail clamp is a split-clamp.

13. The saddle clamp of claim 12, wherein the split-clamp includes a third and a fourth rail clamp body, wherein the first, second, third, and fourth rail clamp bodies are configured to cooperate to urge the first and second rails towards each other.

* * * * *